July 18, 1950    E. SOENKSEN    2,515,573
GRASS AND WEED CUTTER

Filed April 26, 1946    3 Sheets-Sheet 1

Inventor
Edwin Soenksen,
By Clarence A. O'Brien
and Harvey B. Jacobson
Attorneys

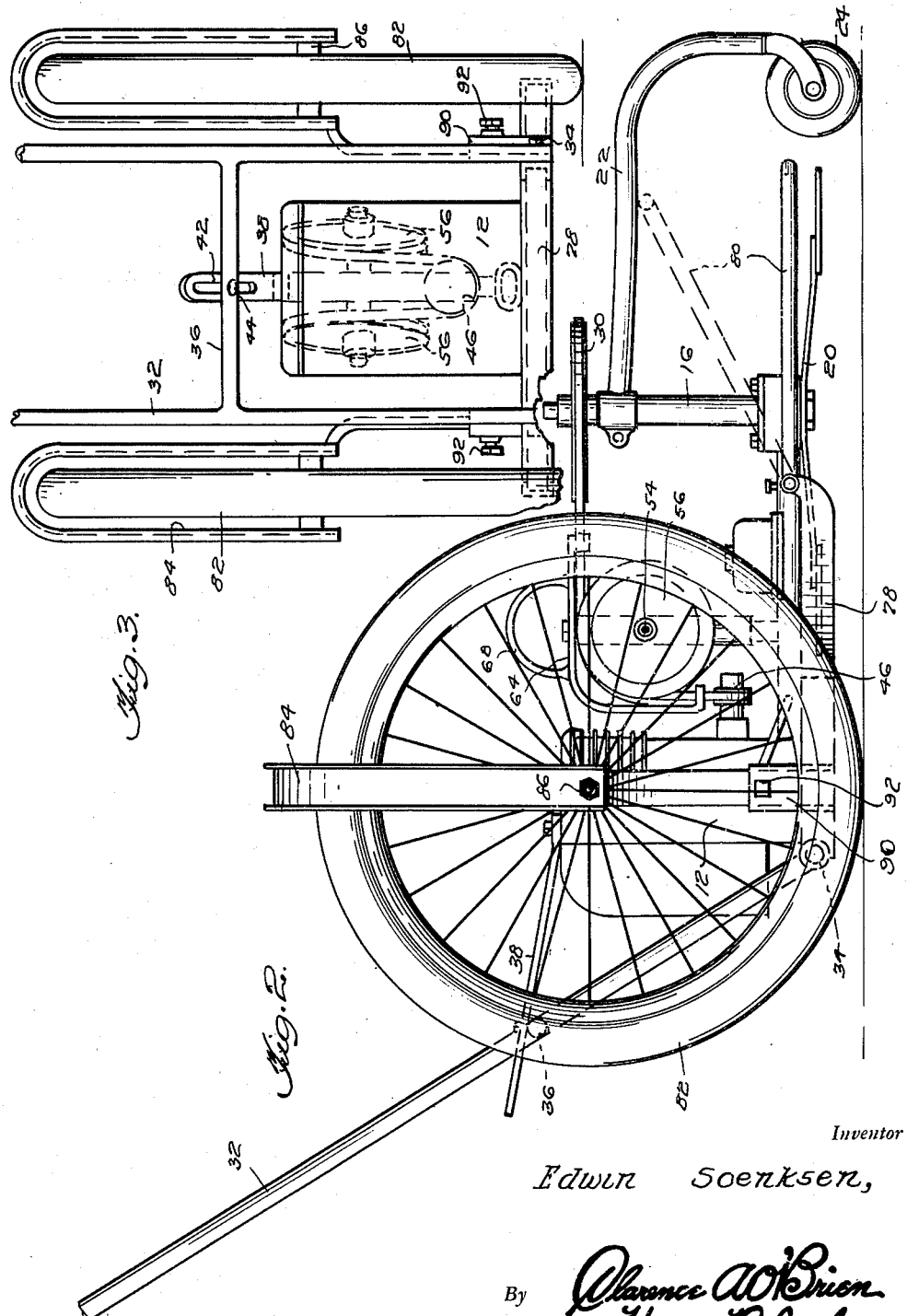

July 18, 1950
E. SOENKSEN
2,515,573
GRASS AND WEED CUTTER
Filed April 26, 1946
3 Sheets-Sheet 3
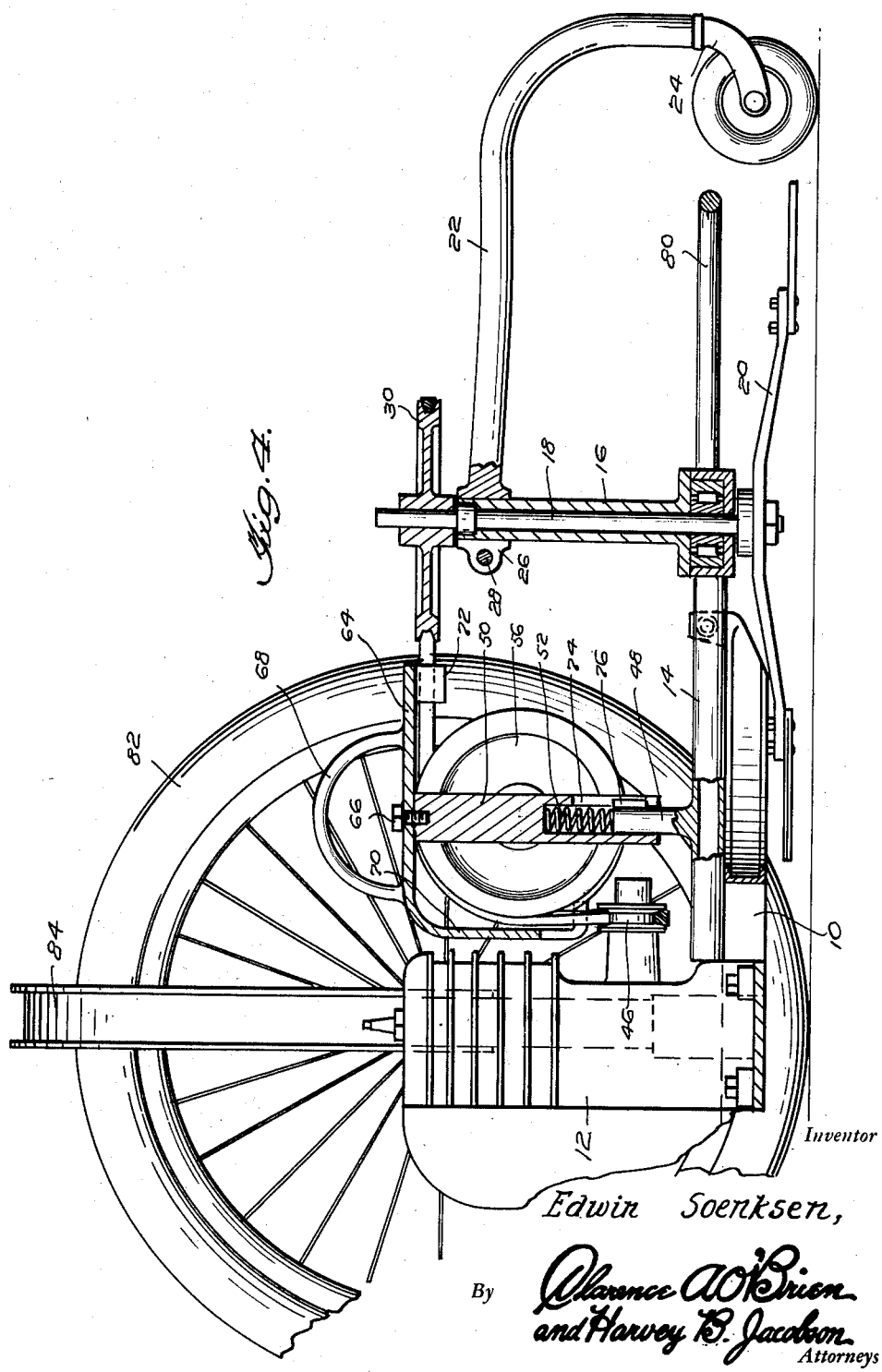
Inventor
Edwin Soenksen,
By Clarence A. O'Brien
and Harvey B. Jacobson
Attorneys Patented July 18, 1950

2,515,573

UNITED STATES PATENT OFFICE 2,515,573

GRASS AND WEED CUTTER

Edwin Soenksen, De Witt, Iowa

Application April 26, 1946, Serial No. 665,068

8 Claims. (Cl. 56—25.4)

This invention comprises new and useful improvements in a grass and weed cutter and more specifically pertains to a portable power driven mowing machine having a horizontally rotating cutter bar.

A primary purpose of this invention is the provision of a mowing machine which may be easily adjusted to cut at varying heights and which with equal facility will mow grass lawns or high weeds.

An important object of the invention is to effect an efficient mechanism for driving the cutter bar of a mower.

Another important aim of the invention is to design a mower having efficient means for manipulating and controlling the appliance.

These, together with numerous other objects of the invention, which will later become apparent as the description proceeds, are attained by my device, one embodiment of which has been set forth by way of example in the accompanying drawings, wherein:

Figure 2 is a side elevation of Figure 1;

Figure 3 is a rear elevation of Figure 1, and

Figure 4 is a fragmentary longitudinal vertical sectional view upon line 4—4 of Figure 1.

Figure 1:
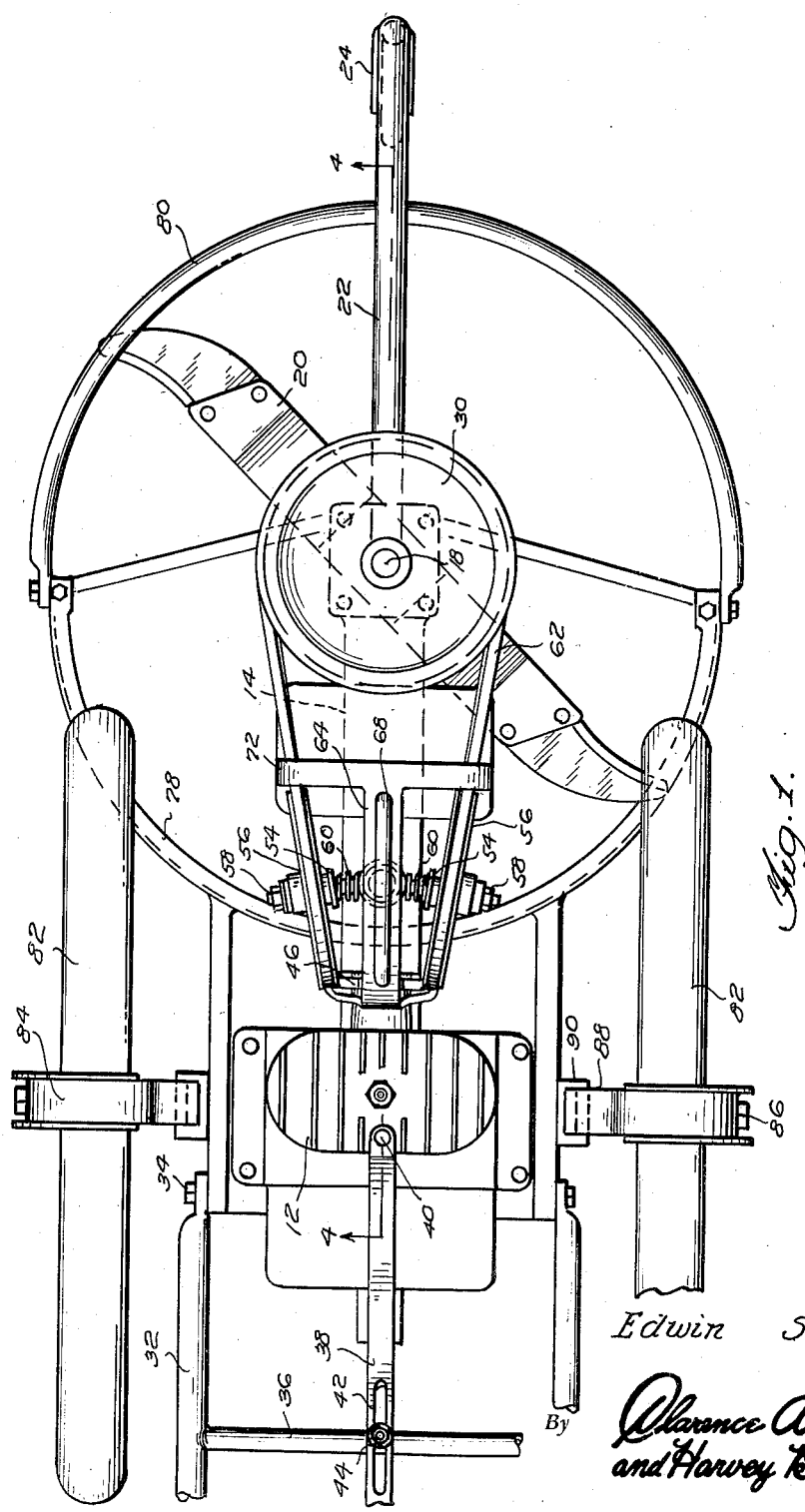
Figure 1 is a fragmentary top plan view of the invention.

Referring more specifically to the accompanying drawings, there is indicated at 10 a base or frame member upon the rear portion of which is supported a motor or engine 12 while extending forwardly from the base is a narrow, elongated frame member 14 upon the front end of which is secured a vertical housing 16 constituting a casing for journaling the vertical spindle 18 of a cutter bar 20 which is mounted below the base member and disposed for rotation in a horizontal plane. A downwardly curving arm 22 adjustably and slidably embraces the housing member 16 and is provided with a caster 24 at its forward end for supporting and guiding the forward portion of the base or frame of the mower. As shown at 26 in Figure 4, the arm member 22 terminates in a split sleeve construction which is adapted to clamp or embrace the housing 16 and to be secure in adjusted position as by a tightening device consisting of a bolt 28. Seated upon the upper end of the spindle 18 is a driving pulley 30 for the cutter bar which is adapted to be driven by the motor 12 in a manner to be subsequently set forth.

Secured to the rear end of the housing 10 are a pair of upwardly inclined handle members 32 disposed transversely of said base member and journaled thereto as at 34. At any convenient point intermediate their length the handles 32 are then connected by means of a rod 36 and the angular inclination of the handles relative to the base member is adjusted to suit the convenience of the user by means of a reinforcing bar 38 secured to a portion of the motor as at 40 at one end thereof and at its other extremity having a slotted portion 42 slidably receiving a bolt 44 secured to the transverse bar 36. As will be evident, the fastening means 44 may be loosened, the handles elevated or lowered to the desired position with the bolt 44 riding freely in the slot 42, and the bolt may then be tightened to rigidly secure the handles in the selected position. As indicated at 46 in Figure 4, the motor 12 is provided with a power take off pulley which is disposed for rotation in a plane transverse the longitudinal axis of the base 10. Rigidly secured to the base member 14 and extending vertically therefrom is a vertical rod 48 which guidingly and slidingly receives a cylindrical member 50 a spring 52 being disposed in the tubular recess in the cylindrical member and above the upper termination of the vertical rod 48, to yieldingly urge the cylindrical member upwardly of said base in order to tension the mower drive belt as will now be set forth. Extending laterally from said cylindrical member and to opposite sides thereof but inclined at a suitable angle to the longitudinal axis of the base member 14 are a pair of axles 54 upon which are journaled for free rotation a pair of idler pulleys 56 secured thereto as by a locking means 58 at the end of the axles. A coil spring 60 is disposed between each idler pulley hub and the corresponding side of the cylindrical member 50 in order to yieldingly bias the pulleys against their fastening means. An endless belt member 62 is trained over the horizontally disposed pulley 46 and thence rises vertically and over the vertically disposed idler pulleys 56 and the two sides thereof and extend thence in the horizontal plane about the driven pulley 30. The idler pulleys 56 are properly inclined relative to the longitudinal axis of the base whereby the belt 62 may have its sides extending in straight lines from the circumference of the driven pulley 30 to the idlers 56 and thence downwardly to the driving pulley 46.

In order to shield the rotated pulleys and belt and for the purpose of variably adjusting the tension thereon, I provide a combined guard and shield member consisting of a horizontal portion 64 attached as at 66 to the upper end of the tubular cylinder 50 and having an upwardly extending handle portion 68. The rear end of member 64 is downwardly turned to form a shielding portion 70 extending between the idler pulleys and the motor while laterally and downwardly extending straps 72 are secured underneath the front portion of the member 64 in order to loosely embrace, guide and shield the rotating endless belt 62. As indicated in Figure 4, the lower inside surface of the tubular cylinder 50 is provided with a longitudinally extending groove 74 having an offset shoulder adapted to selectively engage a lug 76 protruding from the lateral surface of the upstanding rod 48, whereby the cylinder may be depressed and the shoulder engaged beneath the lug in order to maintain the cylinder in its depressed position. Since a more or less conventional fastening means may be utilized for this purpose, I have not deemed it necessary to show the exact structural details thereof.

It will be evident from the foregoing, that by depressing the member 50 upon the member 48 the tension of the endless belt 62 may be lessened whereby the rotation of the driving pulley 46 will be ineffective to produce a rotation of the cutter bar 20. The device may be maintained in this position by engaging the fastening means 74 and 76 as mentioned hereinbefore, and when so employed this device functions as a clutch means to engage or disengage the motor from the mower blade. When, however, the member 50 is disengaged from the locking means 74, 76 the spring 52 produced a tension upon the belt member 62 causing rotation of the mower by the motor.

As shown in Figure 1, a semi-circular channel member 78 constituting a guard for the rear portion of the cutter bar 20 is rigidly attached to the base member 10 and at its forwardly extending extremities pivotally supports a semi-circular channel member guard 80 shielding the front travel of the cutter bar 20. As may be seen by the dotted lines showing in Figure 2, the forward guard member 80 may be elevated whereby the cutter bar may be employed to mow tall weeds and the like. As will be evident, when in the lowered position with the two semi-circular shields forming a complete guard member thereabout, the cutter bar 20 may be employed to mow lawns and the like. The rear wheels 82 of the device which may be of the pneumatic, bicycle wire wheel type, are journaled in yoke members consisting of U-shaped inverted channel members 84 to which the wheels are journaled as at 86. The inwardly disposed leg of each yoke is elongated and slidably disposed in a vertical channel 88 of a bracket member 90 secured to each side of the base member 10 with a bolt or fastening means 92 being employed to maintain the yokes and consequently the wheels in properly vertically adjusted position relative to the base 10. From the foregoing description, it will be obvious that the base and the cutter bar may be vertically adjusted to any suitable height above the ground by proper arrangement of the yoke members and of the front wheel supporting rod 22.

From the foregoing description, in connection with the drawings, it will be seen that I have provided a mowing machine which is portable, easily adjusted to any desired height, has a novel improved clutch mechanism for driving the cutter bar from the motor and in general is adapted for ready manipulation for the purposes intended.

It is to be distinctly understood that I do not limit myself to the exact construction shown in the drawings and described in the specification, but that I may avail myself of any reasonable modifications falling within the scope of the appended claims.

I claim as my invention:

1. In a mowing machine, a base, a motor secured upon the rear of said base, supporting wheels journaled at the rear of said base, a vertically extending spindle rotatably journaled at the front of the base, a horizontally rotatable cutter bar secured to the bottom of said spindle, a front caster adjustably mounted upon a housing for the spindle of said cutter bar, driving means operatively connecting said motor with said cutter bar, a pair of handles pivoted to the rear of said base, and adjustable means for securing the handles in predetermined angularly disposed and inclined position relative to said base, said adjustable means consisting of an axially and longitudinally slotted bar secured to said motor and a fastening means slidable and selectively secured in said slot and attached to said handles, said fastening means including a rod interconnecting said handles intermediate their ends, a bolt secured to said rod and slidably received in the slot of said bar, and a lock nut on said bolt.

2. In a mowing machine, a base, a motor secured upon the rear of said base, supporting wheels journaled at the rear of said base, a vertically extending spindle rotatably journaled at the front of the base, a horizontally rotatable cutter bar secured to the bottom of said spindle, a front caster adjustably mounted upon a housing for the spindle of said cutter bar, driving means operatively connecting said motor with said cutter bar, a pair of handles pivoted to the rear of said base, and adjustable means for securing the handles in predetermined angularly disposed and inclined position relative to said base, a pair of inverted U-shaped yokes, each yoke having a depending extension, sockets on said base, said extensions being slidably disposed and vertically adjustable in said sockets, and a wheel journaled in each yoke.

3. In a mowing machine, a base, a motor secured upon the rear of said base, supporting wheels journaled at the rear of said base, a vertically extending spindle rotatably journaled at the front of the base, a horizontally rotatable cutter bar secured to the bottom of said spindle, a front caster adjustably mounted upon a housing for the spindle of said cutter bar, driving means operatively connecting said motor with said cutter bar, a pair of handles pivoted to the rear of said base, and adjustable means for securing the handles in predetermined angularly disposed and inclined position relative to said base, a pulley on said motor in a vertical plane transverse said base, a pulley on the upper end of said spindle, a pair of laterally spaced idler pulleys in vertical planes slightly inclined to the longitudinal axis of said base, and a driving belt connecting said pulleys, said lateral pulleys being journaled on oppositely extending horizontal shafts, said shafts secured to an inverted cylindrical casing, a rod secured to said base and guidingly supporting said cylindrical casing, and a spring interposed between said rod and said casing to yieldingly urge said idler pulleys upwards to take up the tension in said belt.

4. In a mowing machine, a base, a motor secured upon the rear of said base, supporting wheels journaled at the rear of said base, a vertically extending spindle rotatably journaled at the front of the base, a horizontally rotatable cutter bar secured to the bottom of said spindle, a front caster adjustably mounted upon a housing for the spindle of said cutter bar, driving means operatively connecting said motor with said cutter bar, a pair of handles pivoted to the rear of said base, and adjustable means for securing the handles in predetermined angularly disposed and inclined position relative to said base, a pulley on said motor in a vertical plane transverse said base, a pulley on the vertical spindle of said cutter, a pair of laterally spaced idler pulleys in vertical planes slightly inclined to the longitudinal axis of said base, and a driving belt connecting said pulleys, said lateral pulleys being journaled on oppositely extending horizontal shafts, said shafts secured to an inverted cylindrical casing, a rod secured to said base and guidingly supporting said cylindrical casing, and a spring interposed between said rod and said casing to yieldingly urge said idler pulleys upwards to take up tension in said belt, and handle means for selectively raising and lowering said cylindrical casing and means to retain said tubular casing in lowered position, said last mentioned means including a longitudinally extending groove in said casing having an offset shoulder, a laterally extending lug secured to said rod and extending into said groove, said shoulder being adapted to engage said lug upon depression of said casing.

5. In a mowing machine having a base, a vertically extending spindle rotatably journaled on the base, a horizontal cutter secured to the spindle, a front caster adjustably mounted upon a housing for the spindle of said cutter bar, and a motor on said base; a means for drivingly interconnecting said motor and said spindle comprising a pulley on said motor in a vertical plane transverse said base, a pulley on the upper end of said spindle, a pair of laterally spaced idler pulleys in vertical planes slightly inclined to the longitudinal axis of said base, and a driving belt connecting said pulleys, said lateral pulleys being journaled on oppositely extending horizontal shafts, said shafts being secured to an inverted cylindrical casing, a rod secured to said base and guidingly supporting said cylindrical casing, and a spring interposed between said rod and said casing to yieldingly urge said idler pulleys upwards to take up the tension in said belt.

6. The combination of claim 5 and handle means for selectively raising and lowering said cylindrical casing and means to retain said tubular casing in lowered position, said last-mentioned means including a longitudinally extending groove in said casing having an offset shoulder, a laterally extending lug secured to said rod and extending into said groove, said shoulder being adapted to engage said lug upon depression of said casing.

7. In a mowing machine, a base, a motor secured upon the rear of said base, a vertically extending spindle housing secured to the front of said base, a spindle rotatably journaled in said housing, a horizontally rotatable cutter bar secured to the bottom of said spindle, a laterally extending arm attached to said housing for vertical and angular adjustment about the axis of said housing, a front caster pivotally attached to said arm, driving means operatively connecting said motor with said cutter bar, a pair of handles pivoted to the rear of said base, adjustable means for securing the handles in predetermined angularly disposed and inclined position relative to said base, a pair of U-shaped yokes, each having a depending extension, sockets on said base, said extension being slidably disposed and vertically adjustable in said sockets.

8. In a mowing machine having a base, a vertically extending spindle rotatably journaled on the base, a horizontal cutter secured to the spindle, and a motor on said base; a means for drivingly interconnecting said motor and said spindle comprising a pulley on said motor in a vertical plane transverse said base, a pulley on the upper end of said spindle, a pair of laterally spaced idler pulleys in vertical planes slightly inclined to the longitudinal axis of said base, and a driving belt connecting said pulleys, said idler pulleys being journaled on oppositely extending horizontal shafts, said shafts being secured to an inverted cylindrical casing, a rod secured to said base and guidingly supporting said cylindrical casing, and a spring interposed between said rod and said casing to yieldingly urge said idler pulleys upwards to take up the tension in said belt, a combination belt guide and guard comprising horizontally and vertically extending legs, fingers depending from said horizontal leg guiding a belt as it passes to and from said spindle pulley onto said idler pulleys, and laterally extending fingers on said vertical leg guiding a belt onto said idler pulleys as it passes around said motor pulley, means for attaching said belt guide to the upper end of said inverted cylinder.

EDWIN SOENKSEN.

REFERENCES CITED

The following references are of record in the file of this patent:

UNITED STATES PATENTS

| Number | Name | Date |
|---|---|---|
| 1,308,909 | Landon | July 8, 1919 |
| 1,992,494 | Lundin | Feb. 26, 1935 |
| 2,017,524 | Bolens | Oct. 15, 1935 |
| 2,308,076 | Hainke | Jan. 12, 1943 |
| 2,312,972 | Orr | Mar. 2, 1943 |
| 2,359,358 | Dielschneider | Oct. 3, 1944 |
| 2,403,236 | Phelps | July 2, 1946 |